3,274,286
PROCESS FOR THE REMOVAL OF ACETYLENIC HYDROCARBONS FROM HYDROCARBON MIXTURES CONTAINING DIOLEFINES
Manfred Reich, Marl, Germany, assignor to Chemische Werke Huls Aktiengesellschaft, Marl, Germany, a corporation of Germany
No Drawing. Filed Jan. 23, 1964, Ser. No. 339,576
Claims priority, application Germany, July 10, 1963, C 30,407
2 Claims. (Cl. 260—681.5)

My application Serial No. 311,971 filed September 27, 1963, discloses a process for the removal of acetylenic hydrocarbons from hydrocarbon mixtures containing diolefines by selective hydrogenation in the gaseous phase at temperatures between 30° and 250° C. and pressures between 0.2 and 30 atmospheres absolute by passing the hydrocarbon mixtures in the gaseous phase over and in contact with a mixed catalyst which contains, as its active component so-called copper chromite and which contains also an oxide, hydroxide or salt of a metal, the oxide of which is not reducible by hydrogen at temperatures below 600° C. Such non-reducible metal compounds are compounds of the alkali and alkaline earth metals. It has now been found, in the further development of this process, that acetylenic hydrocarbons can be selectively removed from diolefine containing hydrocarbon mixtures by the use of mixed catalysts similar to those referred to above which contain one or more metals of group VIII of the periodic system of the elements of Mendeleeff and/or silver and/or zinc in place of or in addition to the chromium.

The mixed catalysts are prepared by the simultaneous impregnation of a carrier material with a solution or suspension of a copper salt such as copper carbonate, copper acetate, copper formate or copper nitrate and a solution or suspension of a salt or salts of one or more other metals which activate the hydrogenation activity of the copper such as the carbonate, acetate, nitrate or chloride of iron, cobalt, nickel, silver, zinc, chromium, ruthenium, rhodium, palladium, iridium or platinum and with a solution or suspension of an oxide hydroxide, carbonate, nitrate, acetate, formate or other salt that can be converted into the oxide or hydroxide of one or more metals the oxides of which cannot be reduced by hydrogen below 600° C. These salts may be fixed on the carrier by means of accessory material such as water glass.

Examples of compounds of metals the oxides of which cannot be reduced by hydrogen below 600° C. are the compounds of the metals of group Ia and IIa of the periodic system of the elements of Mendeleeff e.g. calcium oxide, magnesium oxide, barium oxide, calcium carbonate, magnesium carbonate, barium carbonate, magnesium nitrate, barium nitrate, sodium hydroxide and lithium carbonate. The catalyst may be subjected to an intermediate heat treatment at about 500° C. Before the catalyst is contacted with the gas mixture to be hydrogenated it is reduced in the known manner in a hydrogen atmosphere at 100–250° C. After the reduction the copper of the copper compound and the metal of the added activating metal compound will be present as metals or alloys and the metal of the compound of the metal of groups Ia and IIa will be present as its oxide or hydroxide. The catalyst will contain from 5 to 50% by weight of copper, 0.01 to 20% by weight of the activating metal and from 0.1 to 50% by weight of the metal of groups Ia and IIa in the form of the oxide or hydroxide. The foregoing composition figures are based upon the weight of the finished catalyst including the carrier. The additions of the three metal compounds to the carrier are so proportioned that their sum, calculated as metals, is not greater than 60% by weight of the weight of the finished catalyst, that is, the carrier shall amount to at least 40% of the weight of the catalyst. An especially advantageous catalyst composition is 15% by weight of copper, 0.1 to 10% by weight of the activating metal and from 1 to 10% by weight of the metal of group Ia or IIa.

Suitable carriers are silica gel, Stuttgart mass, pumice, kaolin, aluminium oxide and magnesium oxide.

The catalyst is capable of regeneration. The regeneration suitably is carried out by treating the catalyst first at 200° C. with steam and then oxidizing at 200 to 400° C. with air and finally reducing at from about 100 to 200° C. with hydrogen. Depending upon the composition and character of the gas mixture to be purified the catalyst can be used for an average of from 1 to 5 weeks between regenerations.

In the process of the present invention relatively large amounts of hydrogen may be present in the gas mixture without appreciable hydrogenation of the diolefine. Conversely the addition of only slightly more hydrogen than the molecular equivalent of the acetylenic hydrocarbons present is sufficient for the removal of the acetylenic hydrocarbons. The acetylenic hydrocarbons are so extensively removed that they are not detectable by the usual analytical methods and certainly are less than 0.0003%.

The acetylenic hydrocarbons containing hydrocarbon mixtures suitable for use in the process of the present invention consist generally predominantly of diolefines having four carbon atoms in the chain such as butadiene-1,3, butadiene-1,2, isoprene and 2,3 - dimethylbutadiene - 1,3. However diolefines having longer chain lengths such as pentadiene-1,3, pentadiene-2,4 and hexadiene-1,3 can be present. The diolefines may be mixed with other hydrocarbons. Besides they may contain large amounts of hydrogen.

The hydrogenation temperature to be used depends upon the amount of hydrogen added to or present in the gas mixture. When the ratio of hydrogen is high a suitable temperature is 80–110° C. whereas when the ratio of hydrogen is small a suitable temperature is 100–200° C. For example with a hydrogen content range of from 20 to 1% by volume the temperature range is 80 to 150° C. The throughput rate depends upon the acetylene hydrocarbon content of the mixture. The acetylenic hydrocarbon content normally is within the range from 0.05 to 1% by volume and the corresponding throughput rate varies within the range from 1000 to 200 liters, measured under normal conditions per liter of catalyst per hour.

The process can be carried out at atmospheric pressure or at any other pressure at which the diolefine mixture to be purified is at least partially in the gaseous state, preferably within the range from 0.2 to 30 atmospheres' pressure.

The great advantage of the present process resides in the fact that on the one hand diolefine containing gases having high diolefine contents and which have already been extensively purified can be treated with the very selective catalyst and with only small additions of hydrogen so that the resulting products contain only traces of hydrogen whereas on the other hand gases which contain large amounts of hydrogen can be directly hydrogenated noticeable loss of the valuable diolefine contents.

The use of copper catalysts containing 0.1% by weight of iron, nickel, ruthenium, rhodium, palladium, iridium or platinum present based upon the sum of the weights of the metals for selective hydrogenation in the gaseous phase is known. However in this known process a considerable part of the diolefine content of the gas is hydrogenated whereas in the present process the diolefine content of the gas is preserved.

*Example 1*

The starting material was a $C_4$-fraction containing 95.7 mol. percent of butadiene-1,3 and 0.1620 mol. percent of vinyl-, ethyl- and methyl-acetylene (principally the ethyl-acetylene). This fraction is passed in the gaseous state with the addition of 1% by volume of hydrogen through the hydrogenation chamber at the rate of 400 Nl/h. per liter of catalyst. The temperature was maintained at 110–120° C. The catalyst was formed by the simultaneous deposition of basic copper carbonate, nickel carbonate, calcium carbonate and water glass on pumice so that the resulting catalyst contained 14.5% by weight of copper, 0.9% by weight of nickel and 1.6% by weight of calcium. Before use the catalyst was reduced with hydrogen at 200° C. Upon leaving the hydrogenation chamber the gas contained 95.5 mol. percent of butadiene-1,3. The vinyl-, ethyl-, and methylacetylene were not detectable and were therefore less than 0.0003% mol. percent.

*Example 2*

A gas mixture of the following composition in mol. percent

| | |
|---|---|
| Hydrogen | 20.3 |
| n-Butane | 1.3 |
| 1- and iso-butene | 1.7 |
| Trans-butene-2 | 0.5 |
| Cis-butene-2 | 0.3 |
| Butadiene-1,3 | 75.6 |
| Butadiene-1,2 | 0.1 |
| Vinyl-, ethyl- and methylacetylene | 0.195 | was passed at the rate of 430 Nl./h. per liter of a catalyst similar to that used in Example 1 excepting that the calcium carbonate of the catalyst of Example 1 was substituted by an equivalent amount of magnesium carbonate so that the resulting catalyst contained 2.2% by weight of magnesium, 13.8% by weight of copper and 1.2% by weight of nickel. The temperature of the catalyst chamber was maintained at 70–80° C. The gas leaving the catalyst chamber had the following composition in mol. percent

| | |
|---|---|
| Hydrogen | 20.2 |
| n-Butane | 1.3 |
| 1- and iso-butene | 1.9 |
| Trans-butene-2 | 0.7 |
| Cis-butene-2 | 0.4 |
| Butadiene-1,3 | 75.4 |
| Butadiene-1,2 | 0.1 |
| Vinyl-, ethyl- and methylacetylene | -- |

The content of butadiene-1,3 was practically unchanged while the acetylene compounds were so completely removed that no residue thereof was detectable and was therefore assumed to be less than 0.0003% mol. percent.

*Example 3*

$C_4$-fraction containing 95.5 mol. percent of butadiene-1,3, 1.5 mol. percent of hydrogen and 0.1550 mol. percent of vinyl-, ethyl- and methylacetylene (principally ethylacetylene) was passed at the rate of 400 Nl/h. per liter of catalyst at atmospheric pressure. The temperature of the catalyst chamber was maintained at 130–140° C. The catalyst was similar to that of Example 1 but the nickel carbonate was substituted by an equivalent amount of iron carbonate and the calcium carbonate was substituted by an equivalent amount of lithium carbonate so that the catalyst contained 3.5% by weight of lithium, 12.5% by weight of copper and 1.0% by weight of iron. After leaving the catalyst chamber the gas mixture contained 95.3 mol. percent of butadiene and the acetylenic hydrocarbon content was not detectable (less than 0.0003 mol. percent).

*Example 4*

The starting material was a hydrocarbon fraction containing 95.5% by weight of isoprene and 0.3% by weight of methylbutene and methylbutenine. This fraction was passed as a gas at the rate of 400 Nl/h. over 1 liter of a catalyst similar to that used in Example 2 excepting that silica gel was substituted for pumice as the carrier. Before entering the hydrogenation chamber 10% by volume of hydrogen was added to the fraction. The hydrogenation temperature was 80–90° C. The resulting hydrocarbons contained 95.4% by weight of isoprene. Methylbutine and methylbutenine were not detectable.

*Example 5*

A $C_4$-fraction containing 93.5 mol. percent of butadiene-1,3, 3 mol. percent of hydrogen and 0.162 mol. percent of vinyl-, ethyl- and methylacetylene (principally ethylacetylene) was passed under a pressure of 5 atmospheres over 200 ml. of a catalyst similar to that used in Example 2 at the rate of 500 Nl./h./liter of catalyst. The hydrogenation temperature was maintained at 110–120° C. After leaving the chamber the acetylenic hydrocarbon content of the gas mixture was less than 0.0003 mol. percent and the butadiene-1,3 content remained practically constant at 93.4 mol. percent.

*Example 6*

A $C_4$-fraction with a content of butadiene-1,3 of 12.8 mol. percent and a hydrogen content of 1.5 mol. percent was passed at 6 atmospheres pressure over 200 ml. of a hydrogenation catalyst. The ethyl-, vinyl- and methylacetylene content (principally ethylacetylene) of the fraction was 0.042 mol. percent. The catalyst was produced by the simultaneous addition of water solutions of copper nitrate, iron nitrate, chromium—VI—oxide, palladium chloride and magnesium nitrate to silica gel in such proportions that the product, after reduction, contained 12.5% by weight of copper, 1.2% by weight of iron, 0.3% by weight of chromium, 0.05% by weight of palladium and 4.2% by weight of magnesium. After drying the catalyst was heated in a current of air for 24 hours at an increasing temperature up to 550° C. to decompose the nitrate and then reduced with hydrogen for 24 hours at about 200° C. The gas mixture was passed in contact with the catalyst at the rate of 1000 Nl./h. per liter of catalyst and the temperature of the hydrogenation chamber was maintained at 100–110° C. After leaving the chamber the acetylenic hydrocarbon content of the gas was less than 0.0003% mol. percent while the butadiene-1,3 content remained constant at 12.8 mol. percent.

*Example 7*

(a) The starting material was a butadiene fraction containing 99.5 mol. percent of butadiene-1,3 and 0.0360 mol. percent of higher acetylenes (principally ethylacetylene). This fraction, in the gaseous state, was mixed with 2% by volume of hydrogen and passed at the rate of 500 Nl./h. per liter of catalyst. The temperature of the hydrogenation chamber was maintained at 100–120° C. The catalyst was formed by the simultaneous addition of water solutions of copper nitrate and nickel nitrate to silica gel so that the reduced catalyst contained 12.5% by weight of copper and 0.5% by weight of nickel. After drying the silica gel impregnated with the water solutions the resulting catalyst was heated in a current of air of 24 hours at an increasing temperature up to 550° C. to decompose the nitrate. The catalyst was then reduced with hydrogen for 24 hours at about 200° C. The butadiene gas stream, hydrogenated with this catalyst, after leaving the hydrogenation chamber had a butadiene-1,3 content of 97.7 mol. percent based upon the hydrocarbon mixture used. The added hydrogen was not considered in calculating this percentage. The loss of butadiene therefore amounted to 1.8 mol. percent. Acetylenic hydrocarbons were not detectable in the product and were therefore less than 0.0003% mol. percent.

(b) The process of Example 7(a) was repeated with the difference that the water solution used in forming the catalyst contained, in addition to the copper nitrate, also cobalt nitrate and paladium chloride so that the resulting reduced catalyst contained 12.1% by weight of copper, 0.6% by weight of cobalt and 0.05% by weight of palladium. The stream of butadiene produced, disregarding the hydrogen, contained 97.9 mol. percent of butadiene-1,3 so tha the butadiene loss was 1.6 mol. percent. Acetylenic hydrocarbons were not detectable in the product (less than 0.0003 mol. percent).

(c) The process of Example 7(a) was repeated with the difference that the water solution used in the production of the catalyst contained an addition of magnesium nitrate so that the finished, reduced catalyst contained 13.6% by weight of copper, 0.7% by weight of nickel and 3.0% by weight of magnesium. The butadiene gas stream produced contained, disregarding hydrogen, 99.4 mol. percent of butadiene-1,3 so that practically no butadiene was lost. Acetylenic hydrocarbons were not detectable in the product (less than 0.003 mol. percent). The hydrogenation temperature was 100–110° C.

(d) The process was carried out under the same conditions as in Example 7(b) with the difference that the water solution used in the production of the catalyst contained barium nitrate so that the finished reduced catalyst contained 12.8% by weight of copper, 0.5% by weight of cobalt, 0.06% by weight of palladium and 3.6% by weight of barium. The hydrogenation temperature was 110–120° C. The butadiene stream leaving the hydrogenation chamber, disregarding hydrogen, contains 99.3 mol. percent of butadiene-1,3 so that practically no butadiene was lost. Acetylene is not detectable (less than 0.0003 mol. percent).

It is important to note that the activated copper catalysts without the addition of a metal of groups Ia and IIa (tests (a) and (b) above) cause substantial losses of diolefine. The new catalysts (tests (c) and (d) above) on the other hand have a better selectivity for the hydrogenation and cause, in spite of the presence of an excess of hydrogen (2% by volume) practically no loss of diolefine.

I claim:

1. A mixer catalyst composition consisting essentially of from 5 to 50% by weight of a metal selected from the group consisting of copper and copper chromite, from 0.01 to 20% by weight of at least one element selected from the group consisting of group VIII of the periodic system of Mendeleeff, silver and zinc, and from 0.1 to 50% by weight of a compound selected from the group consisting of the oxides and hydroxides of the elements of groups Ia and IIa of the periodic system of Mendeleeff and a carrier in amount constituting at least 40% by weight of the mixed catalyst.

2. A process for the reduction of the acetylenic hydrocarbon content of a hydrocarbon mixure containing it and a diolefine by selective hydrogenation in the gas phase which comprises passing the hydrocarbon mixture in the form of gas and a quantity of hydrogen which is at least molecularly equivalent to said acetylenic hydrocarbon content at a temperature within the range from 30° to 250° and at a pressure within the range from 0.2 to 30 atmospheres over and in contact with the catalyst composition defined in claim 1.

References Cited by the Examiner

UNITED STATES PATENTS

| | | | |
|---|---|---|---|
| 3,179,488 | 4/1965 | Appell | 252—476 |
| 3,200,167 | 8/1965 | Reich | 260—681.5 |

DELBERT E. GANTZ, *Primary Examiner.*

S. P. JONES, *Assistant Examiner.*